(12) United States Patent
Lin

(10) Patent No.: US 12,710,297 B2
(45) Date of Patent: Aug. 18, 2026

(54) LIQUID BEVERAGE FLOW METER ABLE TO DISTINGUISH AIR

(71) Applicant: Tsai-Hui Lin, Kaohsiung City (TW)

(72) Inventor: Tsai-Hui Lin, Kaohsiung City (TW)

( * ) Notice: Subject to any disclaimer, the term of this patent is extended or adjusted under 35 U.S.C. 154(b) by 313 days.

(21) Appl. No.: 18/407,698

(22) Filed: Jan. 9, 2024

(65) Prior Publication Data

US 2025/0224262 A1 Jul. 10, 2025

(51) Int. Cl.
*G01F 1/10* (2006.01)
*A47G 23/16* (2006.01)
*G01F 23/263* (2022.01)

(52) U.S. Cl.
CPC ............... *G01F 1/10* (2013.01); *A47G 23/16* (2013.01); *G01F 23/263* (2013.01)

(58) Field of Classification Search
CPC . G01F 1/05; G01F 1/053; G01F 1/056; G01F 1/06; G01F 1/065; G01F 1/07; G01F 1/075; G01F 1/0755; G01F 1/08; G01F 1/10; G01F 1/103; G01F 1/106; G01F 1/11; G01F 1/115; G01F 1/1155; G01F 1/12; G01F 1/125; G01F 15/0755; G01F 23/263; A47G 23/16
See application file for complete search history.

(56) References Cited

U.S. PATENT DOCUMENTS 4,282,883 A * 8/1981 Yerushalmy ............. G01F 1/10 600/539
6,212,959 B1 4/2001 Perkins
2002/0129663 A1* 9/2002 Hoyt ....................... G01F 1/115 73/861.79
2007/0090296 A1* 4/2007 Hoyt ......................... G01F 3/10 250/357.1
2007/0222619 A1* 9/2007 Moran ................ G01F 15/0755 702/45

(Continued)

FOREIGN PATENT DOCUMENTS

KR 20180101839 A * 9/2018 ........... A47G 21/182
PT 2087322 E * 10/2012 ............. G01F 1/075
WO WO-2024121551 A1 * 6/2024 ................ H02J 7/32

OTHER PUBLICATIONS

Kreutzer et al, Sensor systems for monitoring fluid intake indirectly and directly, 2016 IEEE 13th International Conference on Wearable and Implantable Body Sensor Networks (BSN) (Year: 2016).*

*Primary Examiner* — David L Singer
(74) *Attorney, Agent, or Firm* — Rosenberg, Klein & Lee

(57) ABSTRACT

A liquid beverage flow meter having a flow guide chamber and a mounting chamber in a main body is provided. An upper end and a lower end of the main body are provided with a tube while a liquid sensing module is disposed adjacent to the tube. A fan blade mounted in the flow guide chamber is connected with and sensed by a flow sensing module. Thereby a processing module is driven by the liquid sensing module to calculate total rotation times of the fan blade from the flow sensing module and convert the rotation times into liquid flow to be displayed on a display module once the liquid sensing module detects liquid flowing through the tube while users drink the liquid. If no liquid flow is detected, the processing module will not be driven to operate. Thereby water intake volume is calculated more accurately.

11 Claims, 7 Drawing Sheets

(56) References Cited

U.S. PATENT DOCUMENTS

| | | | | |
|---|---|---|---|---|
| 2012/0031195 | A1* | 2/2012 | Skirda | G01F 3/10 356/28 |
| 2013/0319915 | A1* | 12/2013 | Gellibolian | C02F 1/002 210/87 |
| 2016/0258790 | A1* | 9/2016 | Tokhtuev | G01F 22/00 |
| 2019/0120679 | A1* | 4/2019 | Sharma | G01F 23/268 |
| 2019/0174939 | A1* | 6/2019 | Hoffmann | A61B 5/02438 |

* cited by examiner

LIQUID BEVERAGE FLOW METER ABLE TO DISTINGUISH AIR

BACKGROUND OF THE INVENTION

Field of the Invention

The present invention relates to a liquid flow meter, especially to a liquid beverage flow meter able to distinguish air.

Description of Related Art

According to medical reports, human body needs about 1500 cc to 2000 cc of water per day in general for maintenance of physiological functions and removal of waste inside body to keep body health. Yet people often forget to drink water when they are busy with work or without a thirst. Thus a hydration insuring system comprising liquid-flow meter revealed in US Pub. No. 6212959B1 has been developed. A system for insuring proper human hydration comprises an oral-activated flow meter which measures and displays the volume of fluid withdrawn from a reservoir through tubing. An optional check valve prevents return flow of fluid from the user's mouth to the reservoir. Mode and control buttons control operation of a microprocessor and a display. Both alphanumeric and graphical displays show the volume withdrawn as a function of time or other events. Drink reminder alarms are provided through a display or loudspeaker to alert the user when it is time for a drink to ensure proper hydration. Although the above system can measure and display the volume of fluid through the tubing and remind users when it is time for a drink, it can't calculate fluid intake volume accurately while in use. When the users drink water from containers such as cups through straws, they may take in air before drinking water or water in the cup is running low. Yet the hydration insuring system is unable to distinguish water from air the users drink. Thus water intake volume calculated by the system is not accurate while in use.

SUMMARY OF THE INVENTION

Therefore, it is a primary object of the present invention to provide a liquid beverage flow meter able to distinguish air used to calculate total amount of water users drink per day accurately and show results on a display module.

In order to achieve the above object, a liquid beverage flow meter able to distinguish air according to the present invention mainly includes a flow guide chamber and a mounting chamber which are mounted in a main body. An upper and a lower ends of the main body are both connected with a tube while a liquid sensing module is disposed adjacent to the tube. A fan blade mounted in the flow guide chamber is connected with and sensed by a flow sensing module. Thereby a processing module is driven by signals from the liquid sensing module to calculate cumulative total of rotation times of the fan blade from the flow sensing module and convert total rotation times into liquid flow to be displayed on a display module once the liquid sensing module detects liquid flowing through the tube while users drink liquid such as water or drinks. If there is no liquid flow being detected, the processing module will not be driven to work by the liquid sensing module. Thereby calculation of water intake volume is more accurate.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
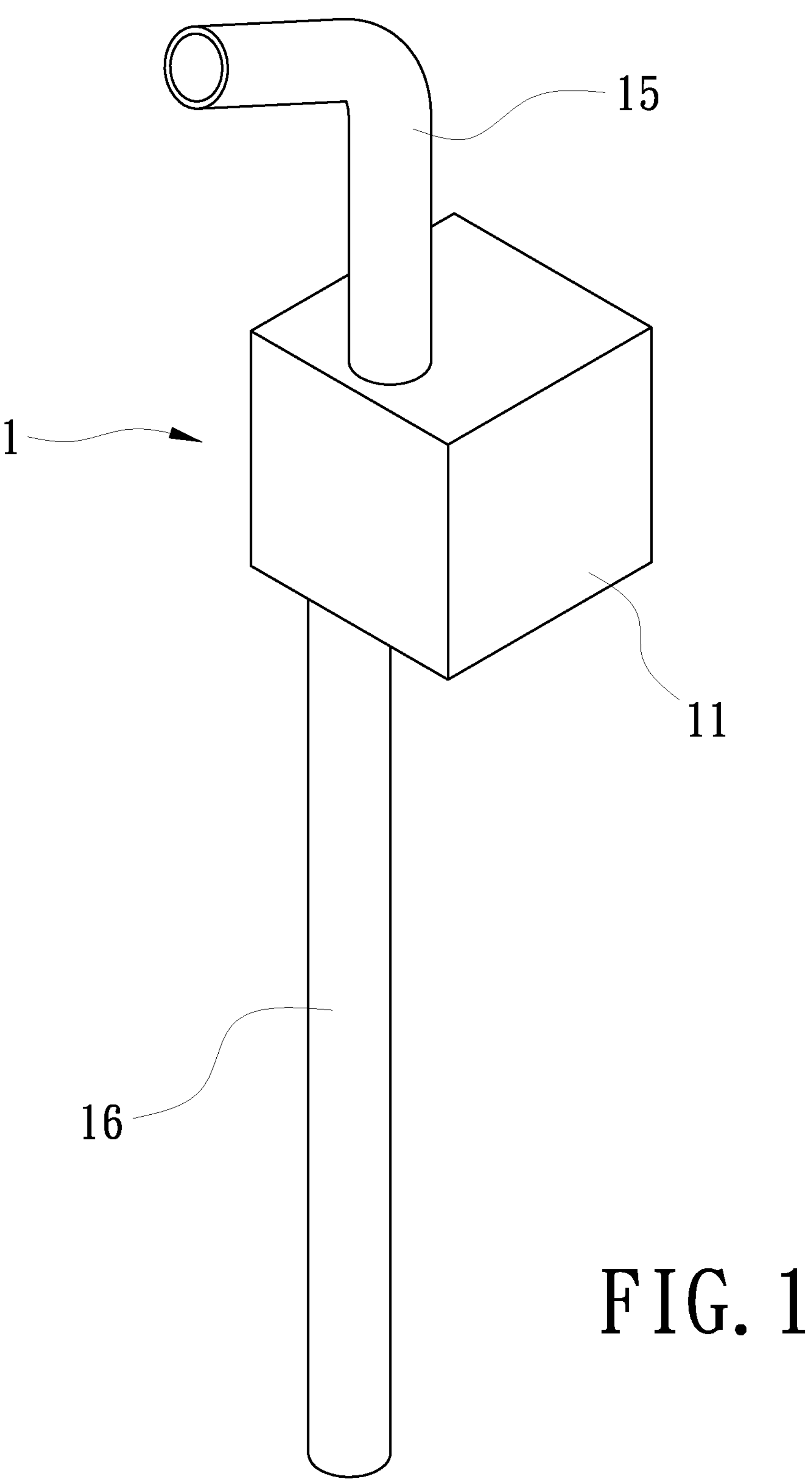
FIG. 1 is a perspective view of an embodiment according to the present invention.
Figure 2:
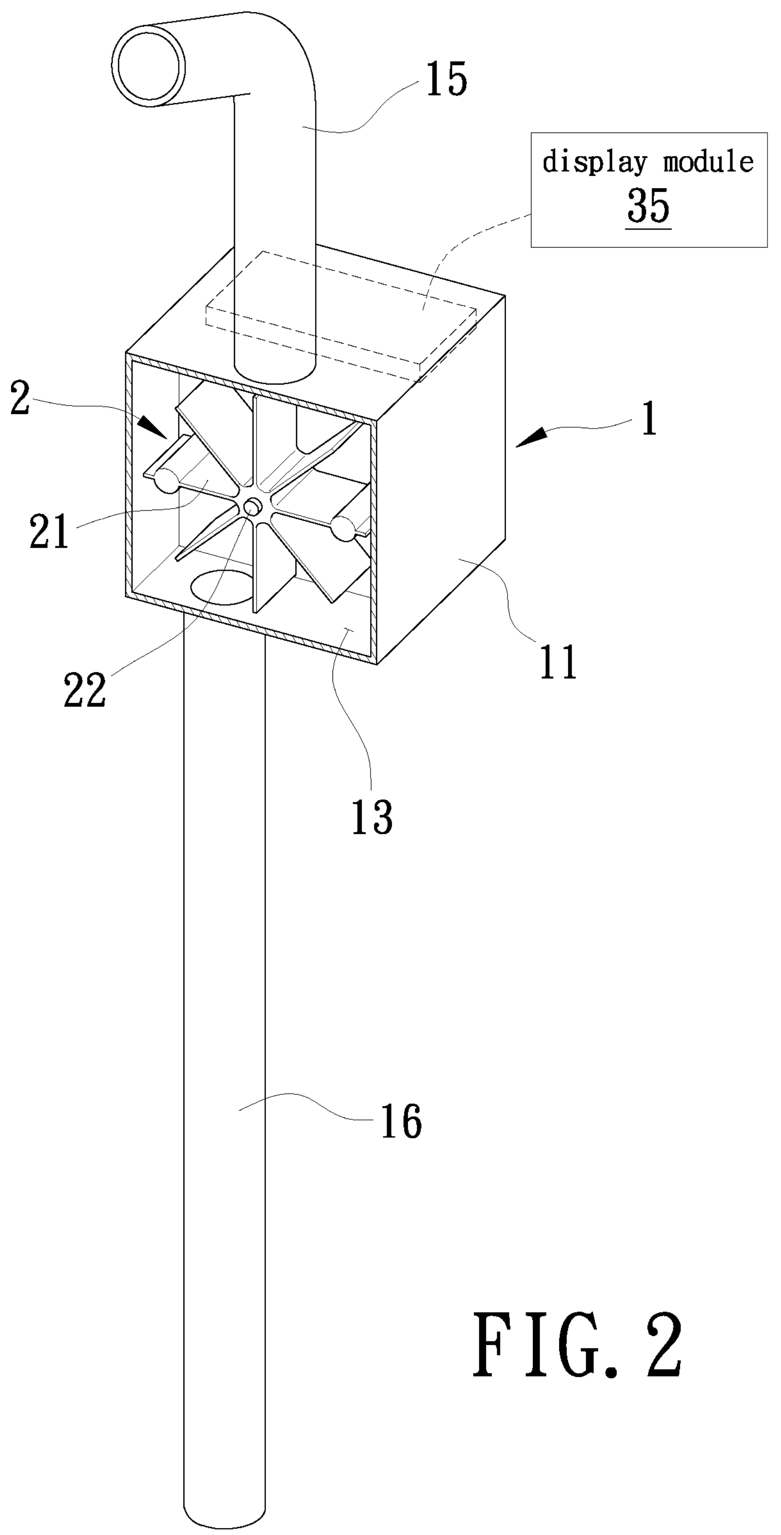
FIG. 2 is a perspective sectional view of an embodiment according to the present invention.
Figure 3:
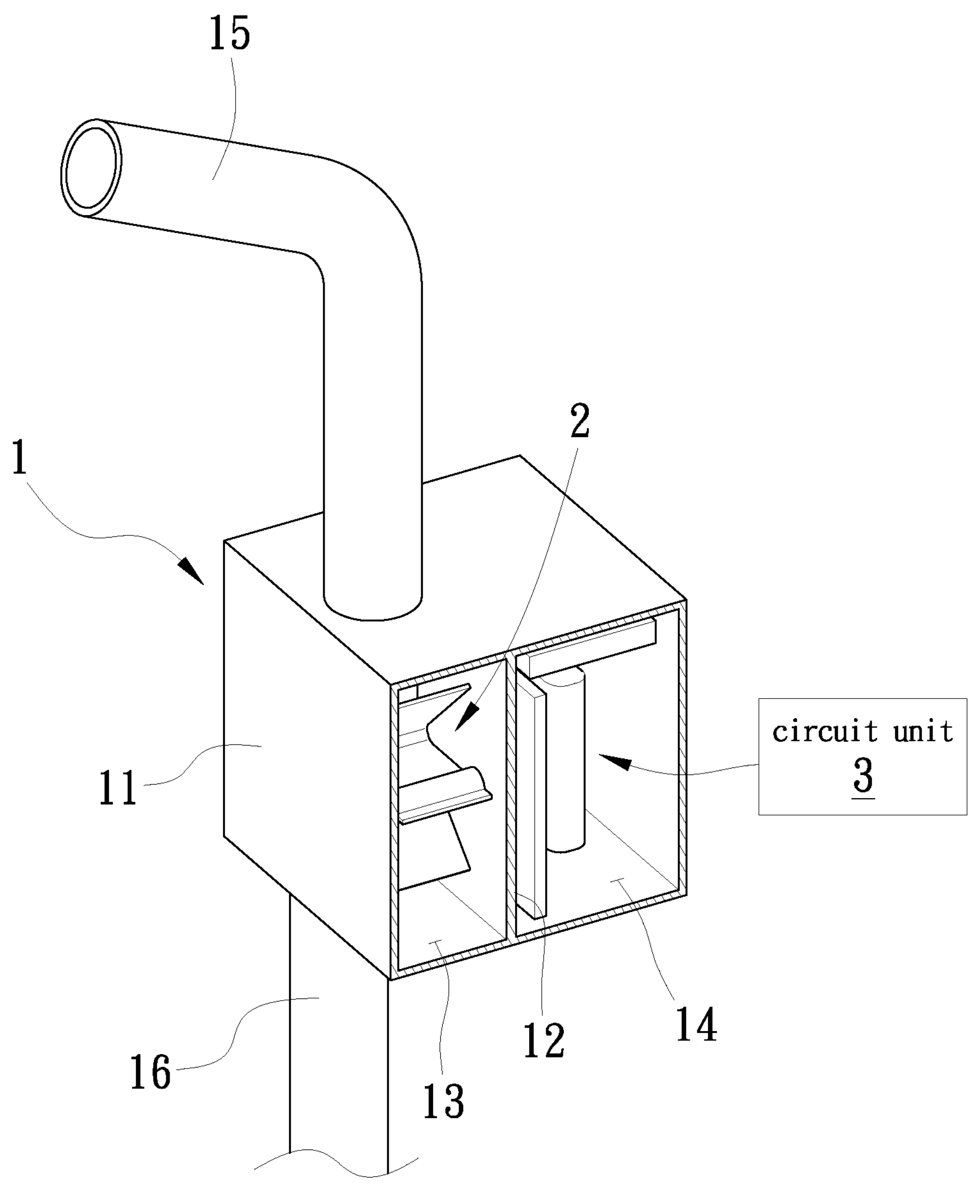
FIG. 3 is another perspective sectional view of an embodiment according to the present invention.

Refer to FIG. 1, FIG. 2, and FIG. 3, a liquid beverage flow meter able to distinguish air mainly includes a main body 1, a flow detection unit 2, and a circuit unit 3.

The main body 1 consists of a transparent housing 11, a partition 12 mounted in the housing 11 and dividing a space in the housing 11 into a flow guide chamber 13 and a mounting chamber 14, a first tube 15, and a second tube 16. The first tube 15 and the second tube 16 which are respectively connected with an upper end and a lower end of the housing 11 are both communicating with the flow guide chamber 13. Thus the main body 1 looks like a straw.

Figure 4:
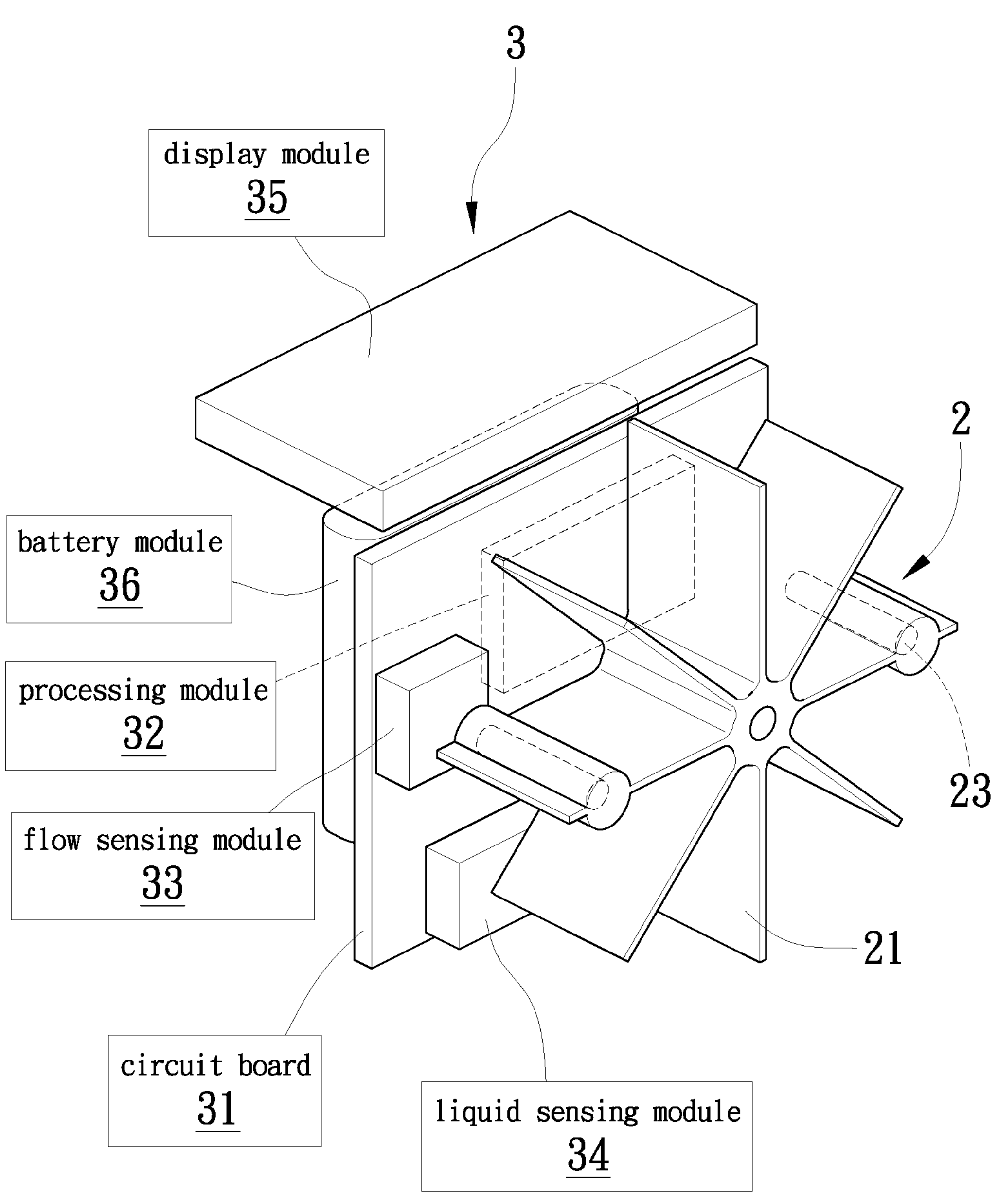
FIG. 4 is a partial enlarged view of an embodiment according to the present invention.

The flow detection unit 2 is mounted in the flow guide chamber 13 of the main body 1. Also refer to FIG. 4, the flow detection unit 2 consists of a fan blade 21, a rotating shaft 22 inserted through a center of the fan blade 21, and at least one metal or magnet 23 is mounted in the fan blade 21 by injection molding. At least one end of the rotating shaft 22 is arranged at a chamber wall of the flow guide chamber 13.

Figure 5:
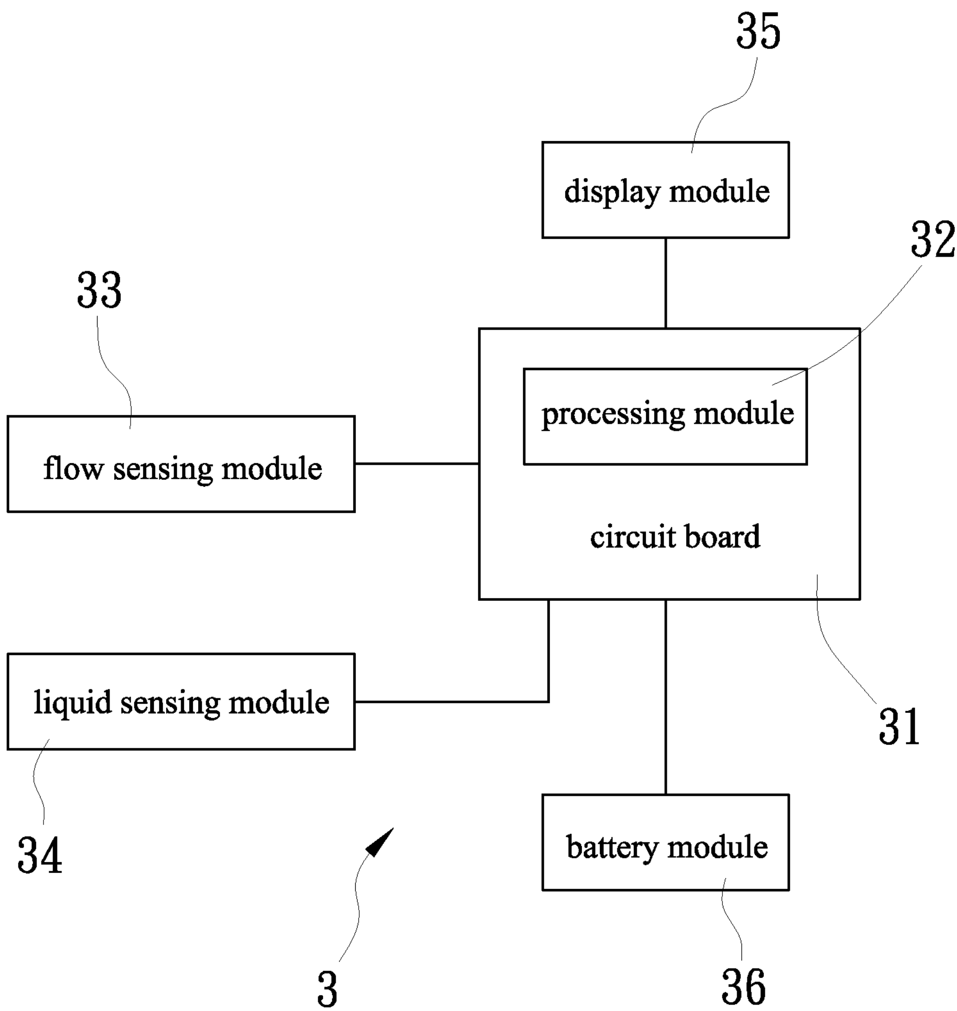
FIG. 5 is a block diagram of circuit of an embodiment according to the present invention.

The circuit unit 3 is mounted in the mounting chamber 14 of the main body 1. Also refer to FIG. 5, the circuit unit 3 is composed of a circuit board 31, a processing module 32, a flow sensing module 33, a liquid sensing module 34, a display module 35, and a battery module 36. The processing module 32, the flow sensing module 33, the liquid sensing module 34, the display module 35, and the battery module 36 are all electrically connected to the circuit board 31. The processing module 32 is a microprocessor and the flow sensing module 33 is a Hall element, a reed switch, or an infrared sensor while the liquid sensing module 34 is a non-contact liquid level sensor such as capacitive touch integrated circuit (IC) or micro switch. The flow sensing module 33 is located at a position corresponding to the fan blade 21 of the flow detection unit 2 for being connected with and sensing the fan blade 21 to detect how many times the fan blade 21 is rotated. As to the liquid sensing module 34, it is disposed adjacent to the first tube 15 or the second tube 16 for detecting liquid flowing through the tubes 15, 16. The display module 35 is a liquid crystal display (LCD) and the battery module 36 is a solar cell able to receive external light through the transparent housing 11.

While in use, the second tube 16 of the straw-like main body 1 is inserted into a cup. When users intend to drink liquid such as water or beverages inside the cup, the liquid sensing module 34 effectively detects whether conductive liquid is flowing through the first tube 15 or the second tube 16. Once there is liquid flowing through, capacitance value of the liquid sensing module 34 changes and thus the liquid sensing module 34 sends signals to the processing module 32 for driving the processing module 32 to calculate cumulative total of rotation times of the fan blade 21 delivered from the flow sensing module 33. In contrast, once the liquid sensing module 34 detects only non-conductive air flowing through the first tube 15 or the second tube 16, there is no change in its capacitance value. The processing module 32 is not driven to work. Thereby the amount of water the user drinks is calculated more accurately.

Figure 6:
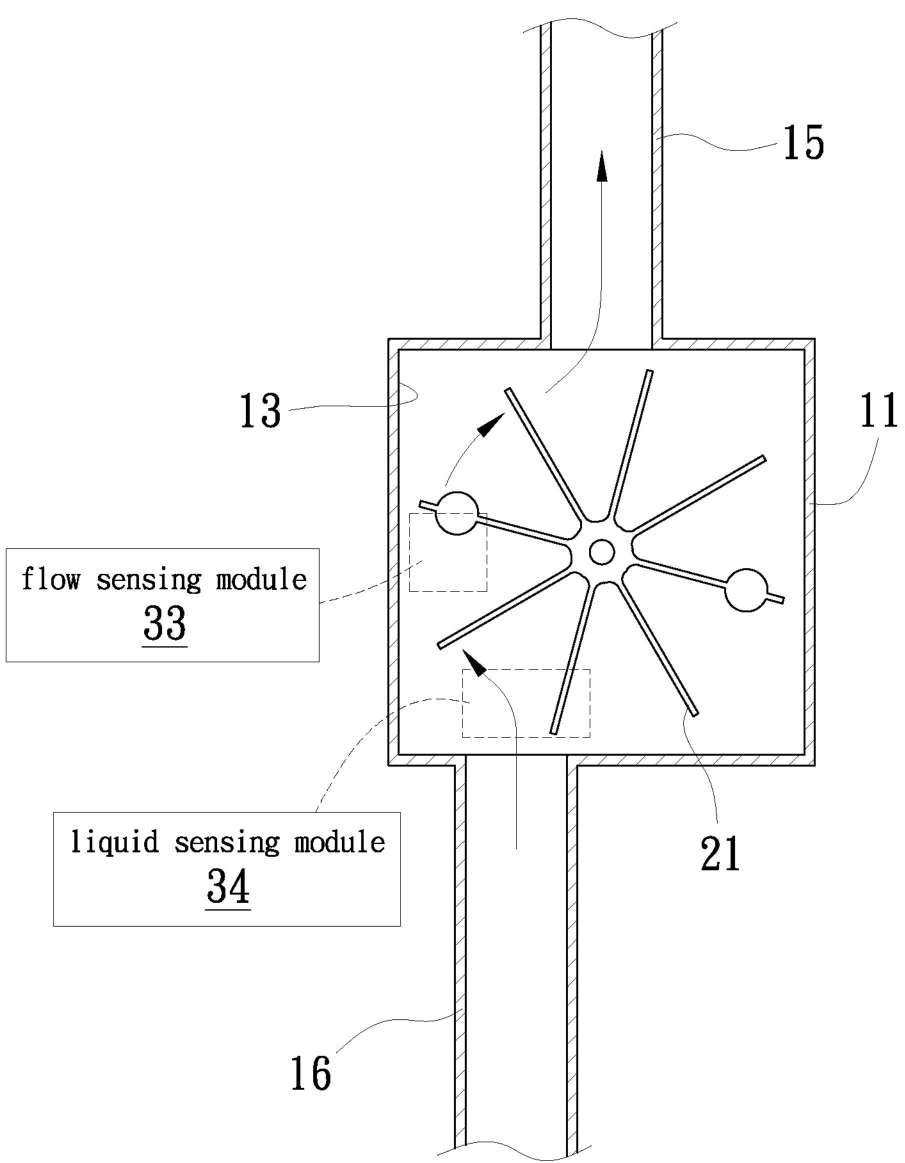
FIG. 6 is a schematic drawing showing an embodiment in use according to the present invention.
Figure 7:
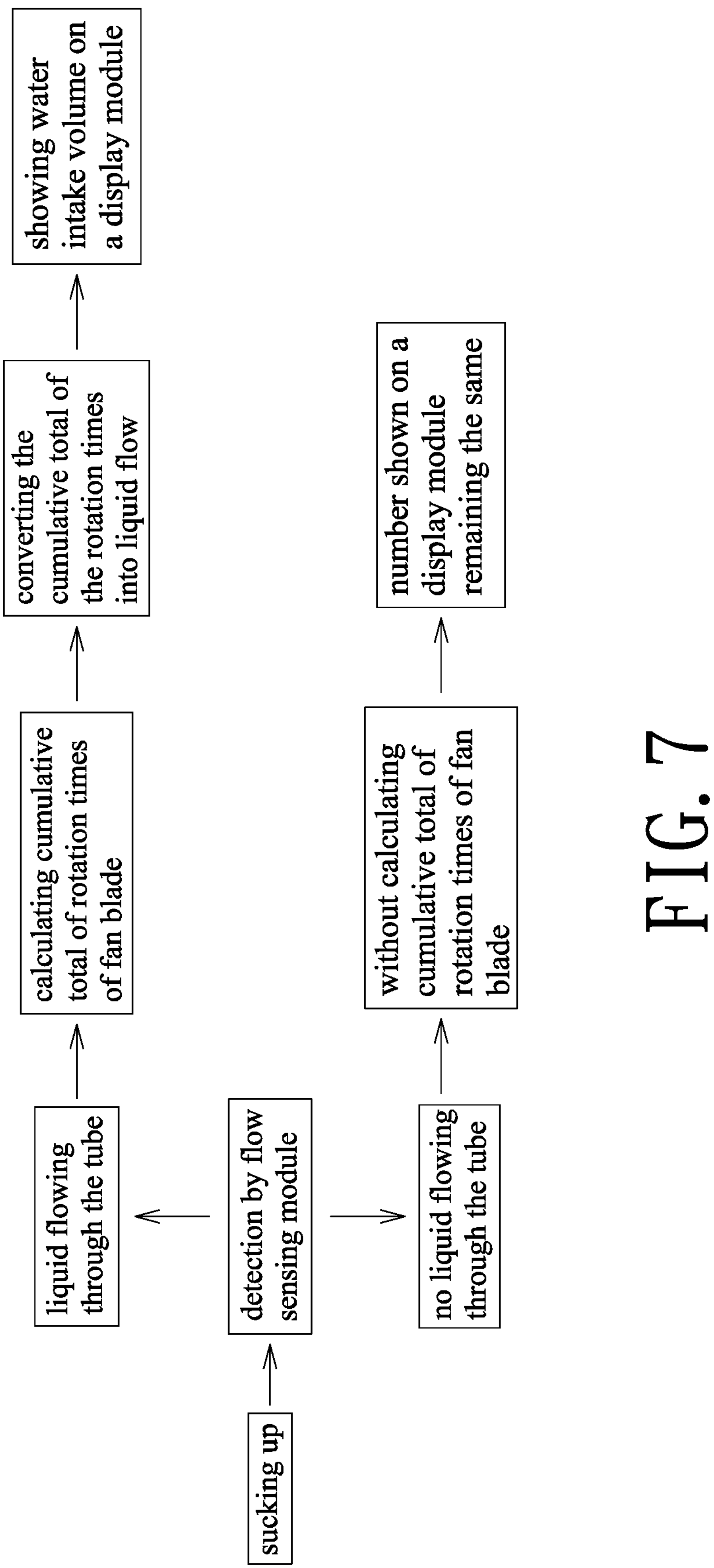
FIG. 7 is a flow chart showing steps of an embodiment in use according to the present invention.

Refer o FIG. 6 and FIG. 7, while the user drinks the liquid in the cup through the first tube 15 of the main body 1, the liquid in the cup is drawn by suction to flow into the flow guide chamber 13 of the main body 1 through the second tube 16 and then move from the flow guide chamber 13 toward the first tube 15. The flowing of the liquid drives the fan blade 21 in the flow guide chamber 13 to rotate. During rotation of the fan blade 21, the flow sensing module 33 connected with and used for sensing the metal or magnet 23 in the fan blade 21 detects changes of magnetic field to learn information of rotation times of the fan blade 21. By the liquid sensing module 34 used for detecting liquid flows passed through, the processing module 32 is driven to calculate cumulative total of the rotation times of the fan blade 21 sent from the flow sensing module 33 only when there is the liquid flowing through the first tube 15 or the second tube 16. Then the cumulative total of the rotation times of the fan blade 21 is converted into liquid flow and thus accumulated amount of the liquid the user drinks is shown on the display module 35. Thereby the user can learn the amount of water he drinks per day accurately. Drinking too little water or too much water has negative effect on the body so that the present flow meter helps users to manage their health effectively.

The above embodiment or figures is not intended to limit the implementation of the present invention. The circuit board 31 of the circuit unit 3 can be electrically connected with a communication module for wireless communication with a mobile phone which is installed with an application program (APP). Thus users can set up target amount of water to drink or reset previous records by the mobile phone. Information such as calculation results of cumulative flow volume can be seen on the mobile phone so that the display module 35 can be omitted. Besides the solar cell, the battery module 36 can be a combination of a storage battery with a USB socket electrically connected with each other. An opening of a hole of the USB socket is located outside the mounting chamber 14 of the main body 1 for connection with an external power plug to charge the storage battery. The battery module 36 can also be a combination of a storage battery with a wireless charger electrically connected with each other for inductive charging in a wireless manner. Moreover, the fan blade 21 can also be made of metal completely besides having the metal or magnet 23 mounted therein by injection molding. Thereby the flow sensing module 33 which is a Hall element can sense the fan blade 21 and detect how many times the fan blade 21 is rotated.

According to the above embodiments, the present invention has the following advantages.

1. The present liquid beverage flow meter able to distinguish air is provided with a liquid sensing module. The processing module in combination with the flow sensing module is driven to count rotation times of the fan blade and calculate intake volume of water only when the liquid sensing module detects liquid flowing through the first tube or the second tube. Thereby calculation of the intake volume of water is more accurate.
2. The present liquid beverage flow meter able to distinguish air is provided with a flow sensing module. When the liquid such as water or beverages flowing through the fan blade and driving the fan blade to rotate, the flow sensing module synchronously detects the rotation times of the fan blade and sends signals to the processing module. Thus the processing module is driven to calculate cumulative total of the rotation times and convert the cumulative total of the rotation times into liquid flow which is shown on the display module. Thereby users can learn how much water they drink a day.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A liquid beverage flow meter able to distinguish air comprising:

a main body having a housing, a partition mounted in the housing and dividing a space in the housing into a flow guide chamber and a mounting chamber, and a first tube and a second tube respectively connected with an upper end and a lower end of the housing and both communicating with the flow guide chamber;

a flow detection unit mounted in the flow guide chamber of the main body and including a fan blade and a rotating shaft disposed on a center of the fan blade and provided with at least one end arranged at a chamber wall of the flow guide chamber; and a circuit unit mounted in the mounting chamber of the main body and including a circuit board, a processing module, a flow sensing module, a liquid sensing module, and a battery module; the processing module, the flow sensing module, the liquid sensing module, and the battery module all electrically connected to the circuit board; the liquid sensing module used for detecting liquid flowing while the flow sensing module connected with and sensing the fan blade of the flow detection unit to detect how many times the fan blade is rotated; wherein the liquid sensing module is a capacitive touch integrated circuit (IC), configured to detect in a non-contact manner whether a conductive liquid flows through the first tube or the second tube;

wherein, when the conductive liquid flows through the first tube or the second tube, a capacitance value of the liquid sensing module changes, and the liquid sensing module accordingly transmits a signal to the processing module to drive the processing module to calculate a cumulative total of rotation counts of the fan blade detected by the flow sensing module;

and wherein, when non-conductive air flows through the first tube or the second tube, the capacitance value of the liquid sensing module remains unchanged, such that the processing module is not activated and an amount of liquid consumed by a user is calculated accurately.

2. The liquid beverage flow meter able to distinguish air as claimed in claim 1, wherein the fan blade of the flow detection unit is provided with at least one magnet; wherein the flow sensing module is a Hall element for connecting with and sensing the magnet of the fan blade.

3. The liquid beverage flow meter able to distinguish air as claimed in claim 1, wherein the fan blade of the flow detection unit is a metal fan blade; wherein the flow sensing module is a Hall element for connecting with and sensing the metal fan blade.

4. The liquid beverage flow meter able to distinguish air as claimed in claim 1, wherein the flow sensing module is a reed switch or an infrared sensor.

5. The liquid beverage flow meter able to distinguish air as claimed in claim 1, wherein the liquid sensing module is arranged adjacent to the first tube or the second tube.

6. The liquid beverage flow meter able to distinguish air as claimed in claim 1, wherein the battery module is a solar cell while the housing of the main body is transparent.

7. The liquid beverage flow meter able to distinguish air as claimed in claim 1, wherein the battery module includes a storage battery and a USB socket electrically connected with the storage battery.

8. The liquid beverage flow meter able to distinguish air as claimed in claim 1, wherein the battery module includes a storage battery and a wireless charger electrically connected with the storage battery.

9. The liquid beverage flow meter able to distinguish air as claimed in claim 1, wherein the circuit unit includes a display module electrically connected with the circuit board.

10. The liquid beverage flow meter able to distinguish air as claimed in claim 1, wherein the circuit unit includes a communication module not only electrically connected with the circuit board but also having wireless communication with a mobile phone.

11. The liquid beverage flow meter able to distinguish air as claimed in claim 1, wherein the main body is in a straw-like shape.

* * * * *